US011379837B2

(12) United States Patent
Yoo

(10) Patent No.: US 11,379,837 B2
(45) Date of Patent: Jul. 5, 2022

(54) METHOD, PROGRAM, AND APPARATUS FOR IDENTIFYING DEVICE BY USING CHIP UNIQUE VALUE-BASED VIRTUAL CODE

(71) Applicant: SSenStone Inc., Seoul (KR)

(72) Inventor: Chang Hun Yoo, Seoul (KR)

(73) Assignee: SSenStone Inc., Seoul (KR)

( * ) Notice: Subject to any disclaimer, the term of this patent is extended or adjusted under 35 U.S.C. 154(b) by 0 days.

(21) Appl. No.: 17/391,844

(22) Filed: Aug. 2, 2021

(65) Prior Publication Data

US 2021/0390543 A1  Dec. 16, 2021

Related U.S. Application Data

(63) Continuation of application No. PCT/KR2020/003192, filed on Mar. 6, 2020.

(30) Foreign Application Priority Data

Feb. 8, 2019  (KR) .................. 10-2019-0015223
Apr. 12, 2019  (KR) .................. 10-2019-0043118
(Continued)

(51) Int. Cl.
*H04L 9/32* (2006.01)
*G06Q 20/40* (2012.01)
(Continued)

(52) U.S. Cl.
CPC ......... *G06Q 20/401* (2013.01); *G06Q 20/351* (2013.01); *G06Q 20/385* (2013.01); *H04L 9/3228* (2013.01); *H04L 63/0853* (2013.01)

(58) Field of Classification Search
CPC .................. H04L 9/3228; H04L 63/0853
(Continued)

(56) References Cited

U.S. PATENT DOCUMENTS 9,098,424 B2 * 8/2015 Hyde, II ............... G06F 16/13
2015/0208238 A1 * 7/2015 Jiang ................. H04L 63/0853
713/156

FOREIGN PATENT DOCUMENTS

JP         2004-274429 A    9/2004
KR       10-1316466 B1   10/2013
(Continued)

OTHER PUBLICATIONS

International Search Report issued in PCT/KR2020/003192; dated Jun. 25, 2020.
(Continued)

*Primary Examiner* — Anthony D Brown
(74) *Attorney, Agent, or Firm* — Studebaker & Brackett PC

(57) ABSTRACT

Embodiments of the present invention provide a method, program, and apparatus that may identify a device by using a virtual code generated based on a unique value of a chip inside a device without a separate procedure for identifying the device. Furthermore, embodiments of the present invention provide a method, program, and apparatus that may generate a virtual code, which is not matched with any other code, whenever a code for identifying a device is requested. Moreover, embodiments of the present invention provide a method, program, and apparatus for identifying a device that may add and use only an algorithm without changing a conventional process.

10 Claims, 8 Drawing Sheets

Virtual code generation means (10) → Virtual code verification means (20)

(30) Foreign Application Priority Data

Aug. 30, 2019 (KR) .......................... 10-2019-0107065
Oct. 21, 2019 (KR) .......................... 10-2019-0130742

(51) Int. Cl.
    *G06Q 20/34*     (2012.01)
    *G06Q 20/38*     (2012.01)
    *H04L 9/40*     (2022.01)

(58) Field of Classification Search
    USPC ........................................................... 726/17
    See application file for complete search history.

(56) References Cited

FOREIGN PATENT DOCUMENTS

| | | |
|---|---|---|
| KR | 10-2013-0134581 A | 12/2013 |
| KR | 10-2014-0144684 A | 12/2014 |
| KR | 10-2015-0072955 A | 6/2015 |
| KR | 10-2017-0043377 A | 4/2017 |
| KR | 10-1751894 B1 | 7/2017 |
| KR | 10-1928519 B1 | 12/2018 |
| KR | 10-2019-0005985 A | 1/2019 |
| KR | 10-2019-0018463 A | 2/2019 |

OTHER PUBLICATIONS

Written Opinion issued in PCT/KR2020/003192; dated Jun. 25, 2020.
An Office Action issued by the Korean Patent Office dated Jul. 19, 2021, which corresponds to Korean Patent Application No. 10-2019-0089829; with English language translation.

* cited by examiner

METHOD, PROGRAM, AND APPARATUS FOR IDENTIFYING DEVICE BY USING CHIP UNIQUE VALUE-BASED VIRTUAL CODE

CROSS-REFERENCE TO RELATED APPLICATIONS

The present application is a continuation of International Patent Application No. PCT/KR2020/003192, filed on Mar. 6, 2020, which is based upon and claims the benefit of priority to Korean Patent Application Nos. 10-2019-0015223 filed on Feb. 8, 2019, 10-2019-0043118 filed on Apr. 12, 2019, 10-2019-0107065 filed on Aug. 30, 2019 and 10-2019-0130742 filed on Oct. 21, 2019. The disclosures of the above-listed applications are hereby incorporated by reference herein in their entirety. The above-listed applications are hereby incorporated by reference herein in their entirety.

BACKGROUND

Embodiments of the present invention described herein relate to a method, program, and apparatus for identifying a device by using a chip unique value-based virtual code, and more particularly, relate to a method, program, and apparatus for identifying a device by using a virtual code, which is not matched with any other code at each time point.

Code-type data is being used in various fields. In addition to a card number or account number used to make a payment, the code type data includes an WIN number, a resident registration number, or the like for user identification.

However, the code data may be leaked when the code data is used. In the case of a card number, because an actual card number is recorded on a card surface as it is, the actual card number is visually exposed to other people. When a payment using a magnet is made, the card number is leaked to other people while being transmitted to a POS device.

The virtual card number was used to prevent the actual card number from being leaked. However, data for identifying a user is needed to search for the actual card number corresponding to the virtual card number. For example, a code of one-time-password (OTP) is changed and generated every time. However, a login procedure is needed to determine an algorithm assigned to the user, and thus it is difficult for OTP to be applied to various fields.

In the meantime, a drone is a generic term of an unmanned aerial vehicle/uninhabited aerial vehicle (UAV) for a military in a shape of an airplane or helicopter capable of flying and being controlled by the guidance of radio waves without a pilot. Around 2010s, drones have been used in various civilian fields in addition to military purposes.

While drones are being used in various fields and spread to civilians with the development of drone technology, there are also side effects such as terrorism using drones. Accordingly, as a need for anti-drone technology is highlighted, the related market is expanding. In addition, the anti-drone technology for identifying whether target drones are friends or foes plays a very important role.

SUMMARY

Embodiments of the present invention provide a method, program, and apparatus that may identify a device by using a virtual code generated based on a unique value of a chip inside a device without a separate procedure for identifying the device.

Furthermore, embodiments of the present invention provide a method, program, and apparatus that may generate a virtual code, which is not matched with any other code, whenever a code for identifying a device is requested.

Moreover, embodiments of the present invention provide a method, program, and apparatus for identifying a device that may add and use only an algorithm without changing a conventional process.

The technical problems to be solved by the present inventive concept are not limited to the aforementioned problems, and any other technical problems not mentioned herein will be clearly understood from the following description by those skilled in the art to which the present invention pertains.

According to an embodiment, a method for identifying a device by using a chip unique value-based virtual code includes receiving, by a virtual code verification means, a virtual code generated by a virtual code generation means, extracting, by the virtual code verification means, a plurality of detailed codes included in the virtual code, and searching, by the virtual code verification means, for a storage location of an actual code based on the plurality of detailed codes. The virtual code is generated based on a unique value assigned in advance to a chip inside the virtual code generation means, and is generated by combining the plurality of detailed codes. The plurality of detailed codes have a correlation for searching for the storage location of the actual code and are changed for each unit count. The unit count is set to a specific time interval and is changed as the time interval elapses.

Furthermore, in the method, the virtual code verification means includes a search algorithm. The search algorithm passes waypoints corresponding to one or more detailed codes among the plurality of detailed codes, performs a calculation based on a correlation between the plurality of detailed codes from the waypoints, and searches for the storage location of the actual code.

Moreover, in the method, the plurality of detailed codes include a first code and a second code. The search algorithm passes a waypoint corresponding to the first code, performs a calculation based on a correlation between the first code and the second code from the waypoint, and searches for the storage location of the actual code.

Also, in the method, when the virtual code generation means is a control device, the virtual code is generated by using a unique value of a chip included in the control device as seed data. The unique value of the chip included in the control device is a serial number assigned not to be duplicated for each control device.

Besides, the method further includes determining, by the virtual code verification means, whether the control device is permitted, identifying permission information about a registered control device when the received virtual code is a normal virtual code, and determining that the register control device is not permitted when the received virtual code is an abnormal virtual code or is not a virtual code generated at a current time point.

In addition, in the method, when the virtual code generation means is an SIM card, the virtual code is generated by using a unique value of a chip included in the SIM card as seed data. The unique value of the chip included in the SIM card is ICCID or IMSI assigned not to be duplicated for each SIM card.

Furthermore, the method further includes verifying, by the virtual code verification means, the virtual code by determining whether a reception virtual code received from the virtual code generation means is identical to a generation virtual code generated within the virtual code verification means. Each of the virtual code generation means and the virtual code verification means includes the same virtual code generation function.

Moreover, the method further includes registering a unique value of the virtual code generation means in the virtual code verification means.

Also, in the method, the virtual code generation means is a control device or an SIM card.

According to an embodiment, a method for identifying a device by using a chip unique value-based virtual code includes generating, by a virtual code generation means, a plurality of detailed codes, generating, by the virtual code generation means, a virtual code by combining the plurality of detailed codes, and providing, by the virtual code generation means, the virtual code to an outside. The virtual code is generated based on a unique value assigned in advance to a chip inside the virtual code generation means. The plurality of detailed codes have a correlation that allows a virtual code verification means to search for a storage location of an actual code and are changed for each unit count. The unit count is set to a specific time interval and is changed as the time interval elapses.

Furthermore, in the method, the virtual code verification means includes a search algorithm. The search algorithm passes waypoints corresponding to one or more detailed codes among the plurality of detailed codes, performs a calculation based on a correlation between the plurality of detailed codes from the waypoints, and searches for the storage location of the actual code.

According to an embodiment, a program for identifying a device by using a chip unique value-based virtual code is stored in a medium to be combined with a computer which is hardware and to perform a method for identifying the above-described device.

According to an embodiment, an apparatus for verifying a chip unique value-based virtual code includes a virtual code reception unit that receives a virtual code generated by a virtual code generation means, a detailed code extraction unit that extracts a plurality of detailed codes included in the virtual code, and an actual code search unit that searches for a storage location of an actual code based on the plurality of detailed codes. The virtual code is generated based on a unique value assigned in advance to a chip inside the virtual code generation means, and is generated by combining the plurality of detailed codes. The plurality of detailed codes have a correlation for searching for the storage location of the actual code and are changed for each unit count. The unit count is set to a specific time interval and is changed as the time interval elapses.

According to an embodiment, an apparatus for generating a chip unique value-based virtual code includes a detailed code generation unit that generates a plurality of detailed codes, a virtual code generation unit that generates a virtual code by combining the plurality of detailed codes, and a virtual code provision unit that provides the virtual code to an outside. The virtual code is generated based on a unique value assigned in advance to a chip inside the virtual code generation means. The plurality of detailed codes have a correlation that allows a virtual code verification means to search for a storage location of an actual code and are changed for each unit count. The unit count is set to a specific time interval and is changed as the time interval elapses.

Other details according to an embodiment of the present invention are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
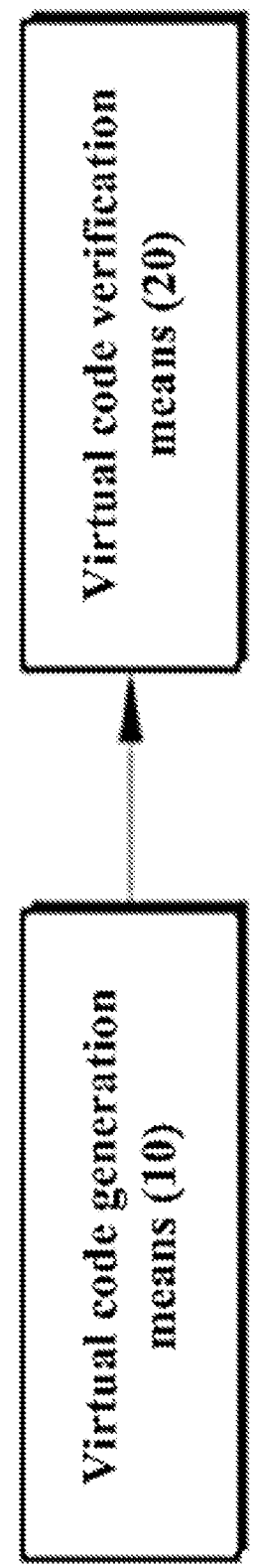
FIG. 1 is a block diagram of a system for identifying a device by using a virtual code based on a chip unique value, according to an embodiment of the present invention.

The above and other aspects, features and advantages of the present invention will become apparent from the following description of the following embodiments given in conjunction with the accompanying drawings. The present invention, however, may be embodied in various different forms, and should not be construed as being limited only to the illustrated embodiments. Rather, these embodiments are provided as examples so that the present invention will be thorough and complete, and will fully convey the concept of the present invention to those skilled in the art. The present invention may be defined by scope of the claims.

The terminology used herein is for the purpose of describing embodiments and is not intended to limit the present invention. In the specification, the singular forms include plural forms unless particularly mentioned. The terms "comprises" and/or "comprising" used herein does not exclude presence or addition of one or more other elements, in addition to the aforementioned elements. The same reference numerals denote the same elements throughout the specification. As used herein, the term "and/or" includes any and all combinations of one or more of the associated components. It will be understood that, although the terms "first", "second", etc., may be used herein to describe various components, these components should not be limited by these terms. These terms are only used to distinguish one component from another component. Thus, a first component discussed below could be termed a second component without departing from the teachings of the present invention.

Unless otherwise defined, all terms (including technical and scientific terms) used herein have the same meaning as commonly understood by those skilled in the art to which the present invention pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

In this specification, an "unique value" means a value assigned differently for each device. For example, the unique value is a unique number assigned to a device itself or a chip included in the device. For example, there is a serial number assigned to a device or a chip included in the device, ICCID or IMSI of an integrated circuit (IC) chip included in a subscriber identification module (SIM) card, or a unique number of the semiconductor chip. The unique value is not limited to the above-mentioned example. The unique value is any value for identifying a device.

In the specification, a "chip" means a component including an IC capable of storing and managing information (e.g., a unique value assigned to each device) about a device, and is a concept including a system-on-chip (SoC).

In the specification, an "applet" means a small-scale program or a small-sized application program composed of JAVA language.

In this specification, a "character" is a component constituting a code and includes all or part of uppercase alphabet characters, lowercase alphabet characters, numerals, and special characters.

In this specification, a "code" refers to a string of characters.

In the specification, a "virtual code" is a code that is temporarily generated to be connected (or matched) to an actual code, and means a code having specific digits composed of characters.

In this specification, a "detailed code" refers to a code used to generate a virtual code. That is, when the virtual code is generated by combining a plurality of codes that are separately generated, the detailed code refers to a respective code that is separately generated and constitutes the virtual code.

In this specification, a 'unit count' is a unit set to a specific time interval and is defined to change as the time interval elapses. For example, 1 count may be used after being set to a specific time interval (e.g., 1.5 seconds).

In this specification, a "virtual code generation function" refers to a function used to generate a virtual code.

In this specification, a "detailed code generation function" refers to a function for generating each detailed code constituting a virtual code.

In this specification, a "detailed code combination function" refers to a function for generating a virtual code by combining or coupling a plurality of detailed codes.

Hereinafter, embodiments of the present invention will be described in detail with reference to accompanying drawings.

FIG. 1 is a block diagram of a system for identifying a device by using a virtual code based on a chip unique value, according to an embodiment of the present invention.

Referring to FIG. 1, according to an embodiment of the present invention, a system 1000 for identifying a device by using a chip unique value-based virtual code includes a virtual code generation means 10 and a virtual code verification means 20.

The virtual code generation means 10 generates a virtual code including information that allows the virtual code verification means 20 to search for an actual code. The virtual code generation means 10 generates a virtual code based on a unique value inside a device depending on the virtual code generation function. That is, the virtual code generation means 10 generates a virtual code by using the chip unique value inside the device as seed data.

In this specification, searching for the actual code includes searching for an actual code (or a storage location of an actual code) itself, the storage location of the actual code, a value matching the storage location of the actual code, or a value corresponding to the storage location of the actual code.

The chip unique value is a value assigned differently so as not to be matched with any other chip unique value for each device at a specific point in time (e.g., at the time of manufacture or at the time of registration). For example, there is a serial number assigned differently to each device, a chip unique value inside an IC card, a device identification value of a mobile device in which an app card is installed, ICCID or IMSI of a subscriber identification module (SIM) card, or an unique number of a semiconductor chip. It is not limited to the above-mentioned example. The chip unique value is any value for identifying a device.

In addition, the virtual code and the actual code are used to perform corresponding roles depending on the type of a virtual code generation device 100. For example, when the virtual code generation device 100 is an IC card for a financial transaction, a virtual code/actual code corresponds to a virtual card number (or a virtual token number)/an actual card number (or an actual token number). Also, for example, when the virtual code generation device 100 is a control device, the virtual code/actual code corresponds to a virtual device identification value/actual device identification value. The roles of the virtual code and the actual code are not limited to the above-described examples, and may be variously applied depending on the role and purpose of the virtual code generation device 100.

As an embodiment of the virtual code generation means 10, when the virtual code generation device 100 is an IC card, the virtual code generation device 100 may be implemented in a form of an applet in the IC card chip.

In another embodiment of the virtual code generation means 10, when the virtual code generation device 100 is a mobile terminal, the virtual code generation device 100 may be implemented in a form of an applet in a USIM included in the mobile terminal. Accordingly, not only when a mobile terminal is a device supporting a near field communication (NFC) function, such as a smartphone, or the like, but also when the mobile terminal does not support the NFC function, the present invention may be implemented. For example, when the virtual code generation device 100 is a 2G mobile phone that does not support the NFC function, the present invention may be applied by implementing the virtual code generation means 10 in a form of an applet in a USIM inserted into the 2G mobile phone. A virtual code is generated through an applet implemented in the USIM, and the generated virtual code is output through a display unit. In a manner of directly entering the output virtual code, a user may deliver the virtual code to a virtual code verification device 200 or to a device and a server that deliver the virtual code to the virtual code verification device 200.

In the meantime, according to an embodiment, because the virtual code verification means 20 searches for an actual code based on the virtual code, the virtual code generation means 10 may not store the actual code. In this way, the actual code may be prevented from leaking through the hacking of the virtual code generation means 10. The detailed description about the virtual code generation function will be given later.

The virtual code verification means 20 searches for the actual code based on the virtual code received from the virtual code generation means 10. The virtual code verification means 20 stores the virtual code generation function the same as the virtual code generation means 10 to search for the actual code from the virtual code received from the virtual code generation means 10.

The detailed description about the method in which the virtual code verification means 20 searches for the actual code based on the virtual code will be given later.

Furthermore, the virtual code verification means 20 verifies whether the virtual code is a code normally generated by the virtual code generation means 10 or a code generated at a current time point. The detailed description about the method in which the virtual code verification means 20 determines whether a virtual code is normal will be given later.

The virtual code verification means 20 may receive the virtual code from the virtual code generation means 10 in various manners.

In an embodiment, the virtual code verification means 20 may receive the virtual code from the virtual code generation means 10 via wireless communication. For example, when the virtual code generation device 100 including the virtual code generation means 10 includes an NFC antenna module, a Bluetooth communication module, or the like, the virtual code generation device 100 may transmit the virtual code to the virtual code verification device 200 through communication with the virtual code verification device 200.

Furthermore, in another embodiment, the user may enter the virtual code generated by the virtual code generation device 100 into a mobile terminal connected to the virtual code verification device 200 through communication, and then the virtual code verification device 200 may receive the virtual code. At this time, the virtual code verification means 20 may receive the virtual code from another server receiving the virtual code from the virtual code generation means 10.

Figure 2:
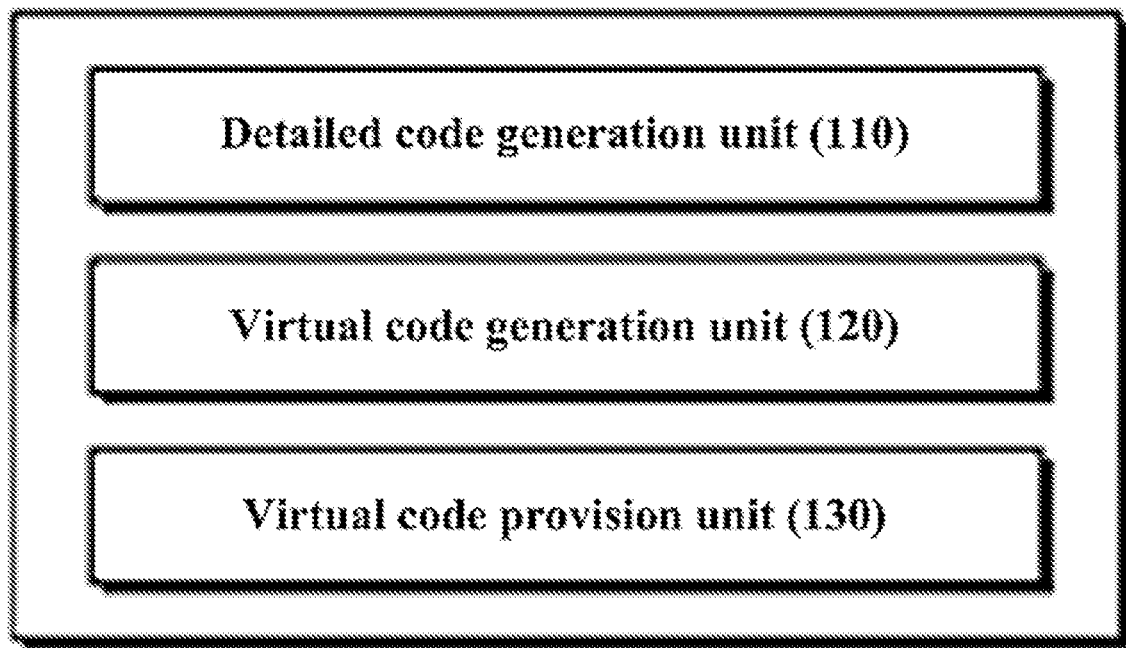
FIG. 2 is a block diagram of a device for generating a chip unique value-based virtual code, according to an embodiment of the present invention.

FIG. 2 is a block diagram of a device for generating a chip unique value-based virtual code, according to an embodiment of the present invention.

Referring to FIG. 2, according to an embodiment of the present invention, the device 100 for generating a chip unique value-based virtual code includes a detailed code generation unit 110, a virtual code generation unit 120, and a virtual code provision unit 130.

According to embodiments of the present invention, the virtual code generation device 100 may be a device, in which the program corresponding to the virtual code generation means 10 is embedded or in which a program corresponding to the virtual code generation means 10 is installed.

For example, the virtual code generation device 100 may be an IC card in which a program corresponding to the virtual code generation means 10 is embedded, a control device (e.g., an IoT device, a drone, unmanned vehicle capable of being driven, or the like), a financial automation device (e.g. an automated teller machine (ATM), a cash dispenser (CD) machine, or the like), or a mobile device in which an application corresponding to the virtual code generation means 10 is installed. The virtual code generation device 100 is not limited to the above-described example and is an arbitrary device capable of generating and transmitting a virtual code.

The virtual code generation unit 120 generates a virtual code based on the chip unique value inside the virtual code generation device 100. That is, the virtual code generation unit 120 generates the virtual code by using the chip unique value inside the virtual code generation device 100 as seed data. The virtual code generation unit 120 may generate the virtual code by combining one or more detailed codes.

According to an embodiment, the virtual code may be generated by combining a plurality of detailed codes depending on a specific rule. The virtual code generation device 100 includes a virtual code generation function for generating a virtual code. The virtual code generation function includes a detailed code generation function for generating a plurality of detailed codes and a rule (i.e., a detailed code combination function) for combining a plurality of detailed codes.

In another embodiment, the virtual code generation device 100 may generate a virtual code without communication with the outside. That is, the virtual code generation device 100 may generate a virtual code without receiving data from the outside.

For example, when the virtual code generation device 100 is an IC card, the virtual code generation function is stored in the IC chip included in an IC card. The virtual code generation function generates the virtual code based on time data and a unique value assigned to the IC chip. Also, the IC card may include a clock for measuring the time data. Moreover, for example, the IC card has a battery for the clock, which supplies power to the clock. The IC card may not include a battery (e.g., a battery for supplying power for generating and providing a virtual code) for supplying power to drive other components other than the clock. In this case, the power for driving the components other than the clock may be received from the outside (a financial transaction terminal, a financial automation device, or the like) at a point in time when a financial transaction is requested by the user.

Also, for example, when the virtual code generation device 100 is a SIM card, the virtual code generation function is stored in an IC chip included in the SIM card. The virtual code generation function generates a virtual code based on time data and a unique value assigned to the IC chip. Also, the SIM card may include a clock for measuring the time data. At this time, features of power supply may be applied in the same manner as the example of the above-described IC card. The power from the outside may be received from a user terminal into which a SIM card is inserted.

Also, for example, when the virtual code generation device 100 is a control device, the virtual code generation function is stored in a chip or semiconductor included in the control device. The virtual code generation function generates a virtual code based on time data and a unique value assigned to the chip or semiconductor. Besides, the control device may include a clock for measuring the time data.

Various methods may be applied to the method of generating a single virtual code by combining the plurality of detailed codes. As the example of the detailed code combination function, the virtual code generation unit 120 may generate the virtual code in the manner of alternately positioning the first code of N-digits and the second code of N-digits. Furthermore, for another example, the detailed code combination function may be a function to combine the second code behind the first code. As the number of detailed codes included in a virtual function increases, the detailed code combination function may be generated variously.

The detailed code generation unit 110 may generate one or more detailed codes. The virtual code generation function includes each detailed code generation function. For example, the virtual code generation function generates the plurality of detailed codes by using the plurality of detailed code generation functions and generates a virtual code by using a detailed code combination function for combining the plurality of detailed codes. The plurality of detailed codes have a correlation used for the virtual code verification means 20 to search for an actual code.

As an example of a correlation between a plurality of detailed codes, the virtual code verification means 20 may include a search algorithm. The search algorithm may pass waypoints corresponding to one or more detailed codes among a plurality of detailed codes, may perform a calculation based on the correlation between the plurality of detailed codes from the waypoints, and thus may search for a storage location of an actual code. At this time, there are one or more waypoints. There is no limitation to the number of waypoints.

Furthermore, as an example of a plurality of detailed codes, the plurality of detailed codes may include a first code and a second code. The detailed code generation unit 110 generates the first code and the second code by including a first function and a second function as detailed code generation functions. The first code and the second code have a correlation for searching for a storage location of the actual code within the virtual code verification means 20. However, the virtual code generation device 100 may include a first function for generating the first code and a second function for generating the second code as detailed code generation functions to improve security, and may not include data for the correlation between the first code and the second code. As a specific example of the correlation between the first code and the second code, the first code may include information about a waypoint. The second code may include information necessary for calculation capable of arriving from the waypoint to the storage location of the actual code. The detailed description of detailed examples of the first code and the second code will be described later.

As an embodiment of the method in which the detailed code generation unit 110 generates a detailed code, the detailed code generation unit 110 may generate one or more detailed codes based on the unique value of a chip included in a device. The virtual code verification means 20 may receive a unique value of a chip included in the virtual code generation device 100, and then may store the unique value of the chip in an actual code storage location or in a separate storage space connected to the actual code storage location. When the virtual code generation device 100 provides the virtual code generated based on the chip unique value to the virtual code verification means 20, the virtual code verification means 20 extracts the chip unique value stored therein and uses the chip unique value to search for the actual code. For example, the virtual code verification means 20 applies time data and the extracted chip unique value to the virtual code generation function, generates a virtual code, and determines whether the virtual code (a reception virtual code) received from the virtual code generation means 10 is the same as a virtual code (a generation virtual code) generated by the virtual code verification means 20. To this end, each of the virtual code generation means 10 and the virtual code verification means 20 may include the same virtual code generation function. Furthermore, because there is a difference between a point in time when the virtual code generation device 100 generates a virtual code and a point in time when the virtual code verification device 200 receives the virtual code, the virtual code verification device 200 generates a virtual code within a specific time range (e.g., within a specific count range based on a point in time when the virtual code is received) in consideration of a time delay and then determines whether there is a value matching the virtual code received from the virtual code generation device 100. When the reception virtual code is the same as the generation virtual code, the virtual code verification means 20 determines that the reception virtual code is a normal virtual code.

Furthermore, the virtual code verification means 20 may determine whether the virtual code is a normal virtual code, an abnormal virtual code, or a virtual code generated at a current time point. The virtual code verification means 20 performs processing corresponding to the determination result. For example, when the virtual code generation device 100 is a control device, the processing corresponding to the determination result is as follows. When the virtual code received from the virtual code generation device 100 is a normal virtual code, the virtual code verification means 20 may identify permission information about the registered control device. When the received virtual code is an abnormal virtual code or is not a virtual code generate at a current time point, the virtual code verification means 20 may determine that the registered control device is not permitted.

As another embodiment of the method in which the detailed code generation unit 110 generates a detailed code, the detailed code generation unit 110 generates the detailed code by using the unique value of the chip included in the device.

For example, a detailed code among the plurality of detailed codes may be generated as an OTP code. At this time, the OTP code may be generated by using the unique value of the chip included in the device as seed data. In this way, even though detailed codes are generated at the same point in time, the detailed codes that are different for each user or device may be generated. In detail, when a plurality of detailed codes include a first code and a second code, the detailed code generation unit 110 may generate an OTP code by using the chip unique value inside a device as seed data, and may generate a second code based on the OTP code. Accordingly, the detailed code generation unit 110 may generate the second code, which is not matched with any other code, for each user or device at the same point in time.

As another embodiment of a method in which the detailed code generation unit 110 generates a detailed code, the detailed code generation unit 110 generates a new detailed code for each unit count, and thus the virtual code generation device 100 generates a new virtual code for each unit count. The virtual code newly generated for each unit count is not generated redundantly. In particular, the detailed code generation unit 110 is configured such that the virtual code newly generated for each unit count is not redundantly generated between users belonging to a specific group as well as not being generated during a specified duration for a specific user or specific the virtual code generation device 100.

The virtual code provision unit 130 provides the virtual code to the outside. The virtual code provision unit 130 may directly provide the virtual code to the virtual code verification device 200, may provide the virtual code to a device or server that delivers the virtual code to the virtual code verification device 200, or may provide the virtual code to a display unit of the virtual code generation device 100 such that a user is capable of directly identifying and entering the virtual code. The virtual code provision unit 130 may include various components capable of providing the virtual code to the outside. The virtual code provision unit 130 may include all or part of a wireless Internet module, a short-range communication module, a display unit, and the like.

The wireless Internet module is a module for wireless Internet access and may be embedded in the virtual code generation device 100 or may be attached on the virtual code generation device 100. The wireless Internet technology may include Wireless LAN (WLAN) (Wi-Fi), Wireless broadband (Wibro), World Interoperability for Microwave Access (Wimax), High Speed Downlink Packet Access (HSDPA), long term evolution (LTE), Long Term Evolution-Advanced (LTE-A), or the like.

The short range communication module refers to a module for short range communication. The short range communication technology may include Bluetooth, Bluetooth Low Energy (BLE), Beacon, Radio Frequency Identification (RFID), Near Field Communication (NFC), Infrared Data Association (IrDA), Ultra Wideband (UWB), ZigBee, or the like.

Figure 3:
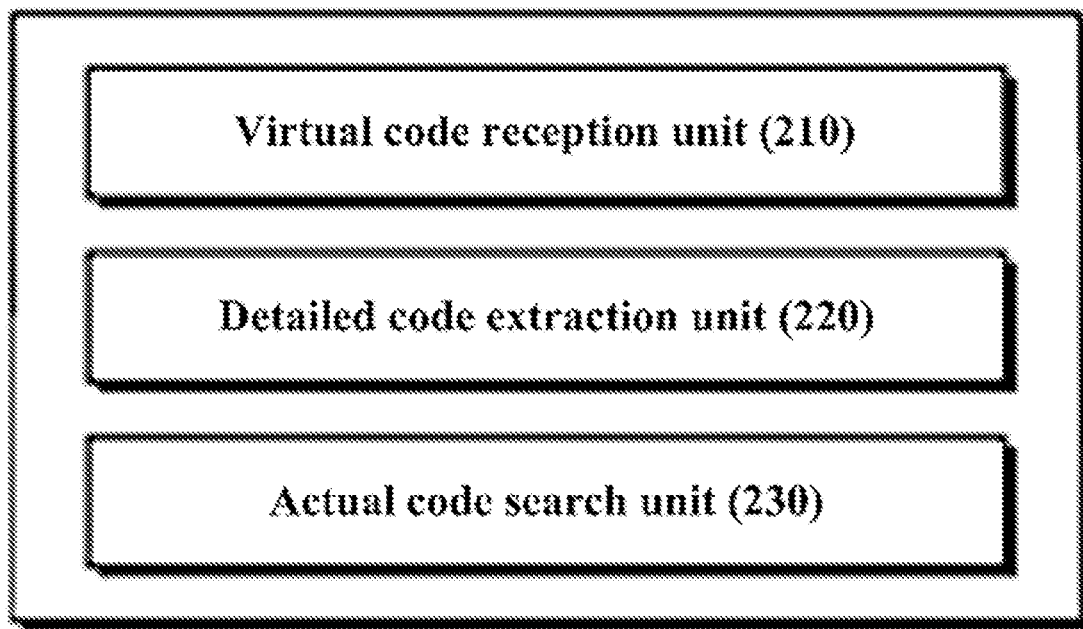
FIG. 3 is a block diagram of a device for verifying a chip unique value-based virtual code, according to an embodiment of the present invention.

FIG. 3 is a block diagram of a device for verifying a chip unique value-based virtual code, according to an embodiment of the present invention.

Referring to FIG. 3, according to an embodiment of the present invention, a device for verifying a chip unique value-based virtual code includes a virtual code reception unit 210, a detailed code extraction unit 220, and an actual code search unit 230.

According to embodiments of the present invention, the virtual code verification device 200 may be a device and server, in which a program corresponding to the virtual code verification means 20 is embedded or in which the program corresponding to the virtual code verification means 20 is installed.

For example, the virtual code verification device 200 may be a device and server for identifying whether a specific control device is permitted. For example, when the virtual code generation device 100 is a drone, the virtual code verification device 200 may identify a permission state of the drone that is in flight. When the virtual code received from the drone is a normal virtual code, the virtual code verification device 200 identifies permission information about the registered drone by matching the received virtual code with the corresponding normal virtual code. On the other hand, when the received virtual code is an abnormal virtual code or is not a virtual code generated at a current time point, the virtual code verification device 200 may perform anti-drone processing by determining that a drone is not permitted. The anti-drone processing includes, but is not limited to, crashing, capturing, or returning a drone by interrupting or disrupting radio waves.

Moreover, for example, the virtual code verification device 200 may be a card issuer server that receives a virtual code for a card, which is owned by a specific user and which has a specific type of the specific card issuer, and then searches for an actual code to make a payment. In detail, in a case of making a payment by using a card, the virtual code verification device 200 receives the virtual code generated by the virtual code generation device 100 through a POS device and a PG server. When the received virtual code is a normal code, the virtual code verification device 200 approves the requested transaction. On the other hand, when the received virtual code is an abnormal virtual code or is not a virtual code generated at a current time point, the virtual code verification device 200 rejects the requested transaction.

Also, for example, a user may perform a financial transaction (e.g., cash deposit and withdrawal, remittance, account inquiry, or the like) through an automated financial device by using the virtual code generation device 100. At this time, the virtual code verification device 200 may be a financial institution server. For example, when the user enters the virtual code into an ATM machine by using an IC card, which is the virtual code generation device 100, (e.g., enters the IC card into a card slot or contacts an IC card to an NFC reader), a financial institution server receives the virtual code from an ATM machine and then searches for an actual code. Also, in another example, even when the user does not have a physical card, or a mobile card is issued without a physical card, financial transactions may be performed by directly entering the virtual code generated by a user terminal, which is the virtual code generation device 100, into the ATM machine. In other words, the virtual code generation device 100 generates a virtual code from the app card installed in the user terminal or an applet in the USIM included in the user terminal. The user may request a financial transaction by directly entering the virtual code output on a display unit of the user terminal into the ATM machine. When the received virtual code is a normal code, the virtual code verification device 200 approves and processes the requested financial transaction. On the other hand, when the received virtual code is an abnormal virtual code or is not a virtual code generated at a current time point, the virtual code verification device 200 rejects the requested financial transaction.

The virtual code reception unit 210 may receive the virtual code from the virtual code generation device 100. In an embodiment, the virtual code reception unit 210 directly receives the virtual code from the virtual code generation device 100, or may receive the virtual code generated by the virtual code generation device 100 through communication with another server.

The detailed code extraction unit 220 extracts a plurality of detailed codes included in the virtual code. The virtual code is generated by combining the plurality of detailed codes depending on a specific rule. In an embodiment, the detailed code extraction unit 220 of the virtual code verification device 200 may include the detailed code combination function the same as the virtual code generation device 100 of a specific group, and thus may extract the plurality of detailed codes from the virtual code by applying the detailed code combination function. For example, when the virtual code generation device 100 generates the virtual code obtained by combining two detailed codes (i.e., the first code and the second code), the detailed code extraction unit 220 may separate the first code and the second code by applying the detailed code combination function to the character string array of the virtual code.

The actual code search unit 230 searches for the storage location of the actual code based on the plurality of detailed codes. Various methods may be applied such that the actual code search unit 230 searches for the storage location of the actual code based on each detailed code. The actual code search unit 230 may include a correlation between detailed codes so as to search for a storage location based on a plurality of detailed codes.

As an example of a correlation between detailed codes, the plurality of detailed codes sets a movement path through which the virtual code verification means 20 searches for a storage location of the actual code. At this time, the movement path is an order in which the virtual code verification means 20 searches for the storage location of the actual code based on the correlation of a plurality of detailed codes. That is, the virtual code verification means 20 searches for the storage location of the actual code depending on the movement path and order that are set depending on the correlation between a plurality of detailed codes. For example, the virtual code verification means 20 may pass waypoints corresponding to one or more detailed codes among a plurality of detailed codes, may perform a calculation based on the correlation between the plurality of detailed codes from the waypoints, and may search for the storage location of the actual code. At this time, there are one or more waypoints. There is no limitation to the number of waypoints.

For example, when the virtual code is composed of a first code and a second code, the first code may include information about a waypoint. The second code may include information necessary for calculation for arriving from the waypoint to the storage location of the actual code. The detailed example will be described with reference to FIG. 6.

Moreover, for example, when the virtual code is composed of a first code and a second code, the actual code search unit 230 may determine a search start point corresponding to the first code and may search for a point, which is moved along a search path corresponding to the second code from the search start point, as the storage location of the actual code. That is, the detailed code may include the first code for setting the start point of the storage location search and the second code for setting the search path from the start point to the storage location, depending on the specific search method.

For example, as the virtual code generation device 100 provides a new virtual code for each unit count, the virtual code verification device 200 may set the search start point and the search path based on the first code and the second code, which are changed for each count, and then may search for the storage location of the actual code.

In the meantime, in an embodiment, to search for a storage location of the actual code by using a plurality of detailed codes having the correlation, the actual code search unit 230 may include a search algorithm. The search algorithm is an algorithm capable of searching for the storage location when each detailed code included in the virtual code is applied.

For example, when the virtual code is composed of a first code including information about a waypoint and a second code including information necessary for a calculation for arriving from the waypoint to the actual code storage location, the search algorithm is an algorithm that adjusts the storage location matching the actual code to be positioned at the corresponding location by passing a waypoint corresponding to the first code and performing an operation based on the information included in the second code. As the search algorithm is used, even though the first code and the second code included in the virtual code are changed, the virtual code verification device 200 may search for the storage location of the actual code or the point matched with the storage location. Various search algorithms may be applied. The detailed description of the search algorithm will be described later.

Figure 4:
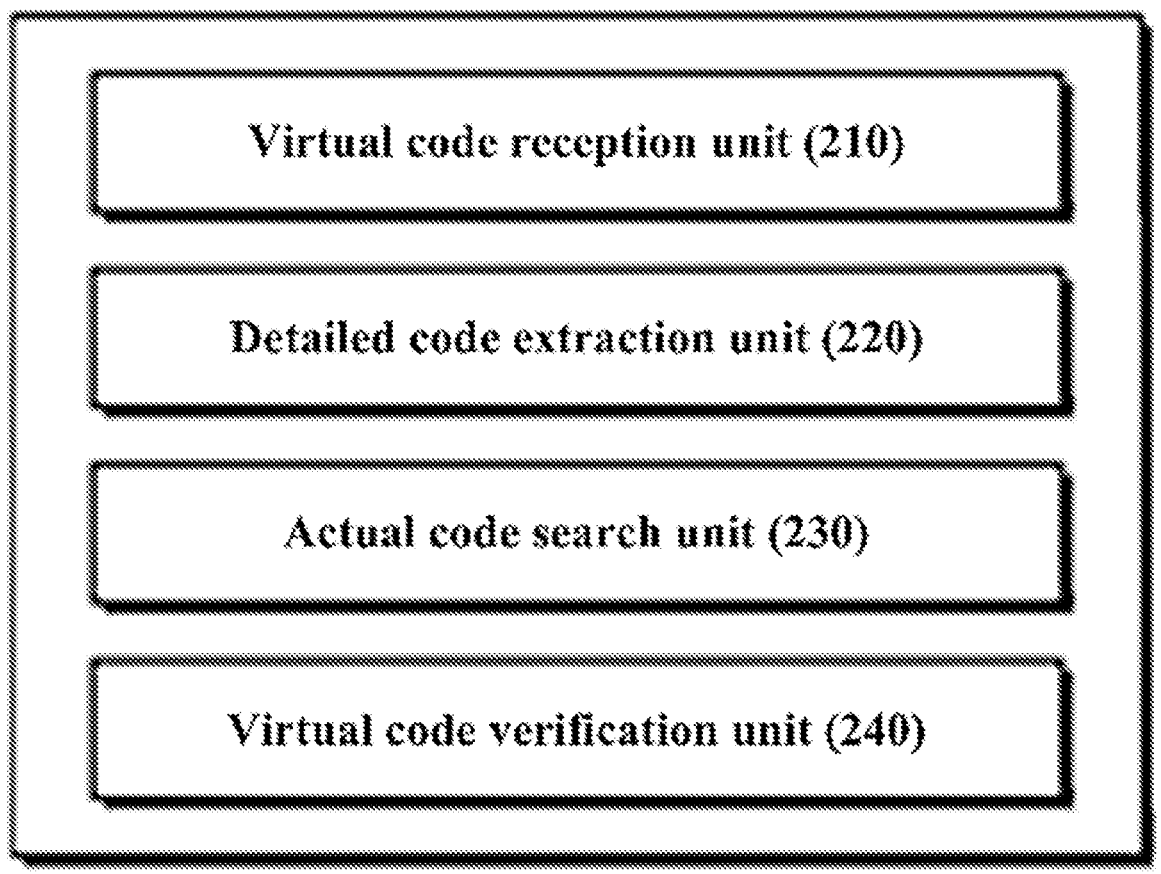
FIG. 4 is a block diagram of a device for verifying a chip unique value-based virtual code, which further includes a virtual code verification unit, according to an embodiment of the present invention.

FIG. 4 is a block diagram of a device for verifying a chip unique value-based virtual code, which further includes a virtual code verification unit, according to an embodiment of the present invention.

Referring to FIG. 4, according to an embodiment of the present invention, a device for verifying a chip unique value-based virtual code further includes a virtual code verification unit 240.

The virtual code verification unit 240 determines whether a virtual code received by the virtual code verification device 200 is authentic.

In an embodiment, the virtual code verification device 200 may include the same virtual code generation function as the virtual code generation device 100. The virtual code verification unit 240 verifies the virtual code by determining whether a reception virtual code received from the virtual code generation means 10 by the virtual code verification means is the same as a generation virtual code generated in the virtual code verification means 20.

Figure 5:
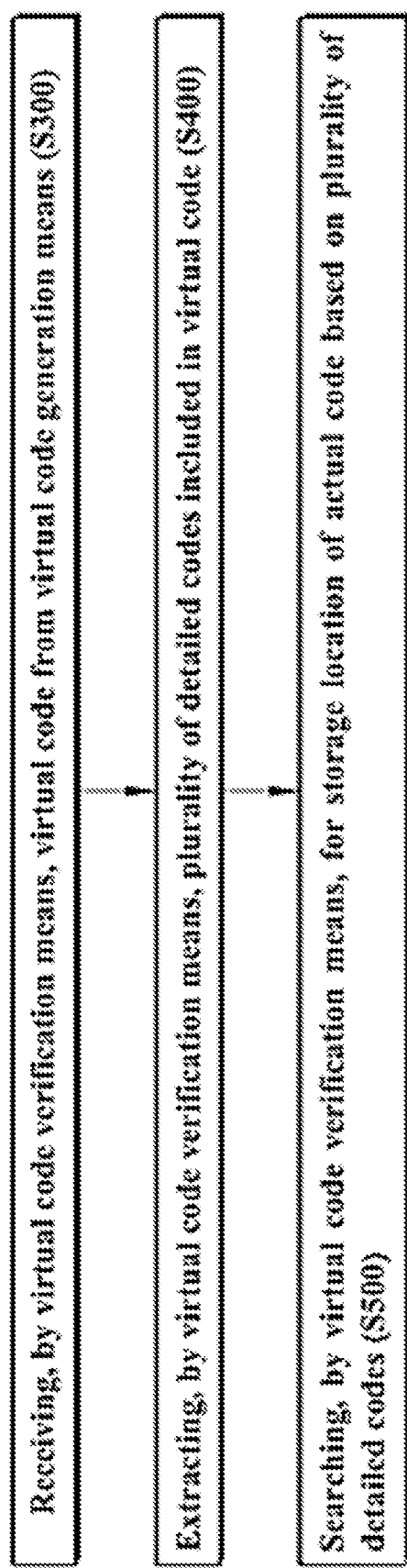
FIG. 5 is a flowchart schematically illustrating a method for identifying a device by using a chip unique value-based virtual code, according to an embodiment of the present invention.

FIG. 5 is a flowchart schematically illustrating a method for identifying a device by using a chip unique value-based virtual code, according to an embodiment of the present invention.

Referring to FIG. 5, according to an embodiment of the present invention, a method for identifying a device by using a chip unique value-based virtual code includes step S300 of receiving, by a virtual code verification means, a virtual code provided by a virtual code generation means, step S400 of extracting, by the virtual code verification means, a plurality of detailed codes included in the virtual code, and step S500 of searching, by the virtual code verification means, for a storage location of an actual code based on the plurality of detailed codes. Hereinafter, the detailed description of each operation is provided. However, the detailed disclosure of the content described in the description process associated with the virtual code generation device 100 and the virtual code verification device 200 is omitted.

Step S300 is a step in which the virtual code verification means 20 receives a virtual code provided by the virtual code generation means 10. The virtual code is generated by the virtual code generation device 100 and then is provided to the virtual code verification device 200.

As described above, the virtual code verification device 200 may receive the virtual code directly from the virtual code generation device 100, or may receive the virtual code from an intermediate device and server that receives the virtual code from the virtual code generation device 100 and delivers the virtual code to the virtual code verification device 200.

Step S400 is a step in which the virtual code verification means 20 extracts a plurality of detailed codes included in the virtual code received from the virtual code generation means 10.

In an embodiment, when the virtual code verification means 20 includes the virtual code generation function included in the virtual code generation means 10, the virtual code verification means 20 extracts a plurality of detailed codes by identically applying a rule (i.e., the detailed code combination function) for combining the plurality of detailed codes. That is, the detailed code combination function corresponds to the rule for arranging a plurality of detailed codes, and is included in the virtual code generation function.

Step S500 is a step in which the virtual code verification means 20 searches for a storage location of the actual code based on the plurality of detailed codes extracted in step S400.

As described above, the plurality of detailed codes have a correlation that allows the virtual code verification means 20 to search for an actual code. That is, the virtual code verification means 20 searches for the actual code storage location based on the correlation between detailed codes.

As an example of a correlation between a plurality of detailed codes, the virtual code verification means 20 may include a search algorithm. The search algorithm may pass waypoints corresponding to one or more detailed codes among a plurality of detailed codes, may perform a calculation based on the correlation between the plurality of detailed codes from the waypoints, and thus may search for a storage location of an actual code. At this time, there are one or more waypoints. There is no limitation to the number of waypoints.

Also, according to an embodiment, the virtual code may be composed of a first code and a second code as detailed codes. The first code and the second code have a correlation that allows the virtual code verification means 20 to search for the storage location of the actual code. As a correlation, the first code may include information about a waypoint, and the second code may include information necessary for calculation capable of being reached from the waypoint to the storage location of the actual code.

For example, the first code is generated by summing an OTP code and a count corresponding to a request time point. The second code is generated by subtracting a value of the storage location of the actual code from the first code. That is, an embodiment of the first code and second code generated by the virtual code generation means 10 is as follows.

First code=current time count+OTP code

Second code=first code−storage location value of actual code

The OTP code is a code generated by the OTP code generation function included in the detailed code generation function, and is a code generated differently every time point. Accordingly, the detailed code may be generated differently depending on a generation time point of the virtual code, thereby preventing the detailed code from being redundantly generated and enhancing security.

A process in which the virtual code verification means 20 searches for an actual code by using the first code and the second code will be described in detail with reference to FIG. 6.

Figure 6:
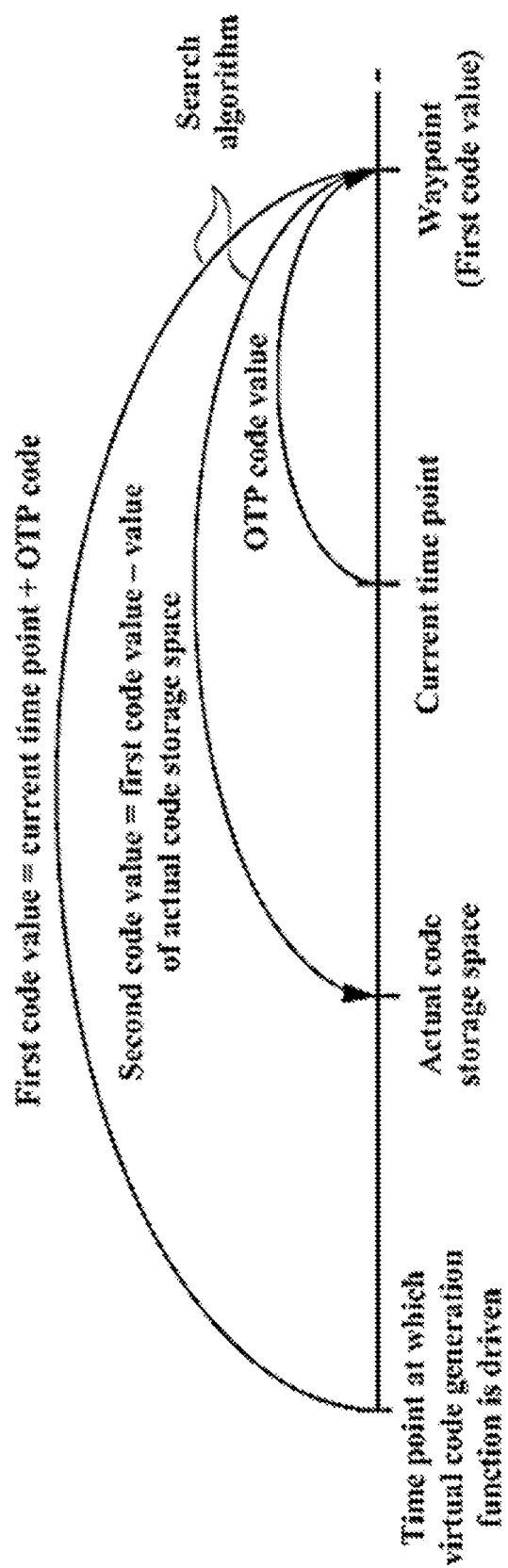
FIG. 6 is an exemplary view illustrating a search algorithm for searching for a storage location of an actual code by moving on a track based on a detailed code, according to an embodiment of the present invention.

FIG. 6 is an exemplary view illustrating a search algorithm for searching for a storage location of an actual code by moving on a track based on a detailed code, according to an embodiment of the present invention.

In an embodiment, the virtual code verification means 20 includes a search algorithm. The search algorithm searches for an actual code by moving to a point matching an actual code storage location during a movement on a track based on a plurality of detailed codes constituting a virtual code. For example, the point matched with the actual code storage location may be a point on the track, which corresponds to a count (i.e., a time point) at which the actual code is issued to the virtual code generation means.

Referring to FIG. 6, the virtual code includes a first code and a second code, as a plurality of detailed codes generated based on a time elapsing from a point in time when the virtual code generation function is driven.

A code value (a first code value) corresponding to the first code is a value obtained by adding an OTP code value to a count corresponding to a current time point based on the point in time when a virtual code generation function is driven. The first code value operates as a waypoint in a process of searching for an actual code.

A code value (a second code value) corresponding to the second code is a value obtained by subtracting a storage location value of an actual code from the first code value. Furthermore, the second code value is a count from a waypoint (the first code value) to the storage location value of the actual code.

As illustrated in FIG. 6, the virtual code verification means 20 passes a count on the track matching the first code value as a waypoint, moves along the track in a direction set by the count corresponding to the second code value, and searches for a point (i.e., a point matching the actual code storage location) on the track at a point in time when the virtual code generation means 10 issues the actual code.

Figure 7:
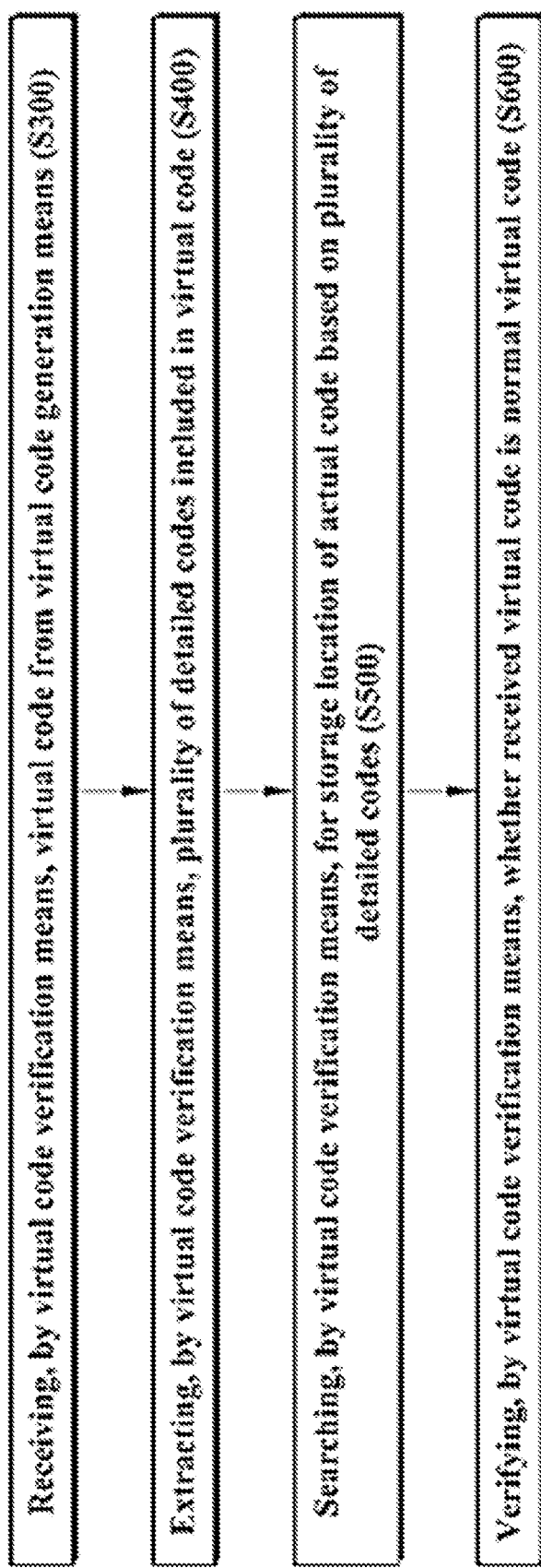
FIG. 7 is a flowchart schematically illustrating a method for identifying a device by using a chip unique value-based virtual code that further includes a step of verifying a virtual code, according to an embodiment of the present invention.

FIG. 7 is a flowchart schematically illustrating a method for identifying a device by using a chip unique value-based virtual code that further includes a step of verifying a virtual code, according to an embodiment of the present invention.

Referring to FIG. 7, as compared with FIG. 5, it will be mainly described that the method further includes step S600 of verifying, by the virtual code verification means 20, whether the received virtual code is a normal virtual code.

Step S600 is a step in which the virtual code verification means 20 verifies whether the virtual code received from the virtual code generation means 10 is a normal virtual code. That is, the virtual code verification means 20 determines whether the virtual code received from the virtual code generation means 10 is a normal virtual code, an abnormal virtual code, or a virtual code generated at a current time point.

In an embodiment, the virtual code verification means 20 verifies whether the received virtual code corresponds to the normally-generated virtual code (a normal virtual code), by applying an inverse function corresponding to the detailed code generation function. For example, when the virtual code is composed of a first code and a second code, the virtual code verification means 20 may verify whether the received virtual code is a normal virtual code, by applying inverse functions of the first function and the second function, which respectively generate the first code and the second code.

In another embodiment, the virtual code verification means 20 includes a virtual code generation function that is the same as the virtual code generation means 10. The virtual code verification means 20 may determine whether the generation virtual code generated through the same virtual code generation function as the virtual code generation means 10 is the same as the reception virtual code received from the virtual code generation means 10, and then may verify whether the reception virtual code is a normally-generated virtual code. Furthermore, because there is a difference between a time point at which the virtual code generation device 100 generates a virtual code and a time point at which the virtual code verification device 200 receives the virtual code, the virtual code verification device 200 may generate a virtual code within a specific time range (e.g., within a specific count range based on a point in time when the virtual code is received) in consideration of the time delay and then may determine whether there is a value matching the virtual code received from the virtual code generation device 100. That is, the virtual code may be verified by applying an acceptable error range.

Figure 8:
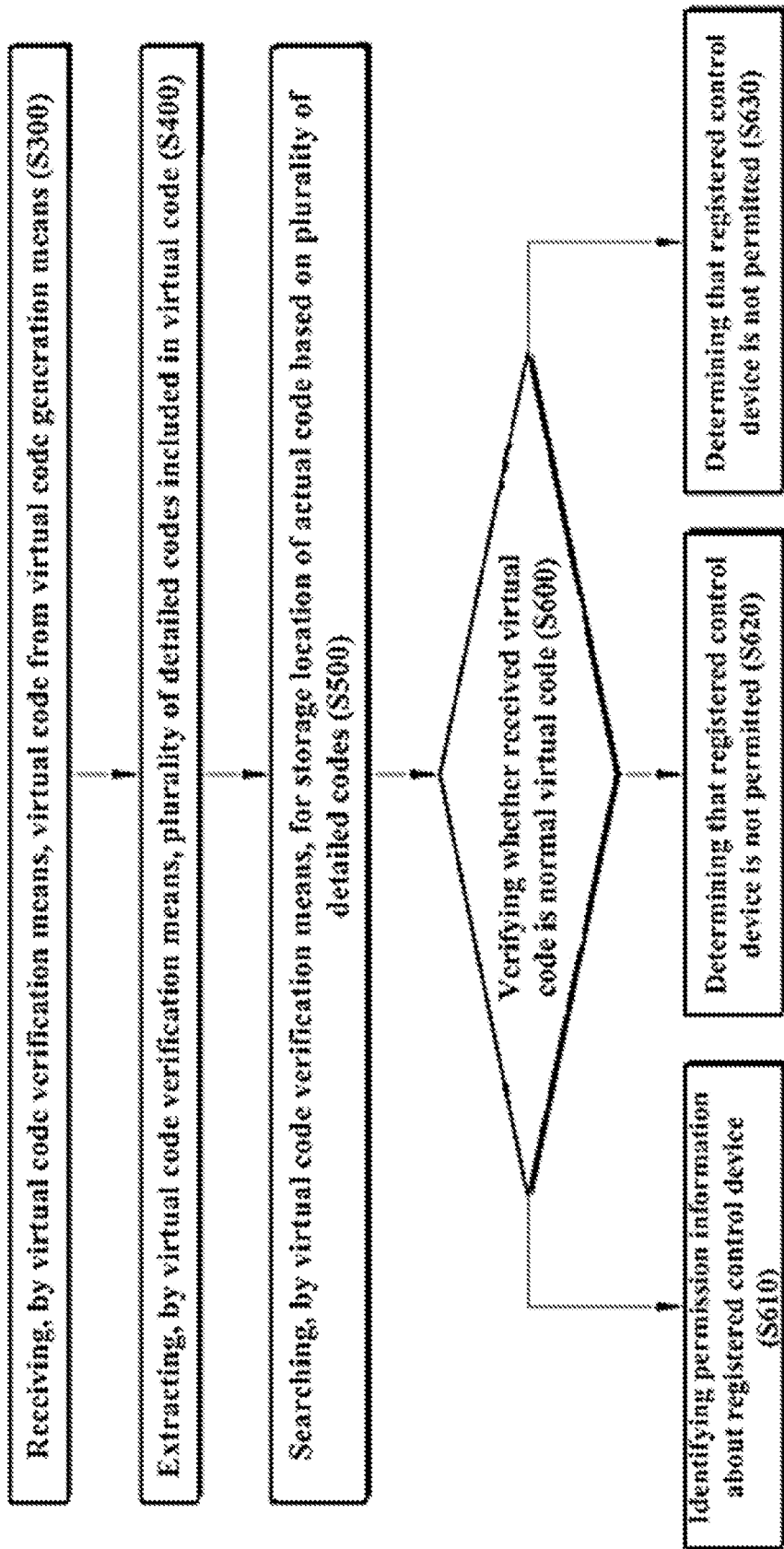
FIG. 8 is a flowchart schematically illustrating a process of determining whether a control device is permitted, according to an embodiment of the present invention.

FIG. 8 is a flowchart schematically illustrating a process of determining whether a control device is permitted, according to an embodiment of the present invention.

According to an embodiment of the present invention, the virtual code generation device 100 may be a control device. The virtual code verification device 200 receives a virtual code from the virtual code generation device 100. The virtual code verification device 200 verifies whether the received virtual code is a normal virtual code, and then performs processing corresponding to the verification result.

Referring to FIG. 8, as compared with FIG. 7, the method further includes step S610 of identifying permission information about a registered control device when the received virtual code is a normal virtual code, step S620 of determining that the registered control device is not permitted, when the received virtual code is an abnormal virtual code, and step S630 of determining that the registered control device is not permitted, when the received virtual code is not a virtual code generated at a current time point.

Step S610 is a step of performing, by the virtual code verification means 20, processing when it is determined that the received virtual code is a normal virtual code, based on a result of verifying the received virtual code. The "normal virtual code" is the normally-generated virtual code through a correct virtual code generation function. The virtual code verification means 20 may search for an actual code based on the normal virtual code, may identify the permission information about the registered control device, and may perform the corresponding processing. For example, when a result of identifying the permission information indicates that the registered control device is permitted, the virtual code verification means 20 may maintain an operation of the control device. When the result of identifying the permission information indicates that the registered control device is not permitted, the virtual code verification means 20 may block the operation of the control device.

Step S620 is a step of performing, by the virtual code verification means 20, processing when it is determined that the received virtual code is an abnormal virtual code, based on a result of verifying the received virtual code. The "abnormal virtual code" is a code that is incapable of being identified by the virtual code verification means 20. For example, a code having a digit number and form that is different from that of the virtual code generated by the virtual code generation means 10 corresponds to an abnormal virtual code.

Step S630 is a step of performing, by the virtual code verification means 20, processing when it is determined that the received virtual code is not a virtual code generated at a current time point, based on a result of verifying the received virtual code. The "virtual code not generated at the current time point" is a virtual code, of which the digit number and form are the same as a normal virtual code but which has time data not corresponding to a current time point. The permission information about the control device may be changed in real time, and thus it is important to identify a state at a point in time (a current time point) when the permission information is identified. Accordingly, when the virtual code is generated at another time point, not the current time point, it is determined that the corresponding control device is not permitted.

In the meantime, according to an embodiment of the present invention, the virtual code verification device 200 may register the virtual code generation device 100 in advance and then may manage the virtual code generation device 100. That is, the virtual code verification device 200 may hold data for verifying the virtual code generation device 100 that has transmitted the virtual code. The virtual code verification device 200 stores the actual code of the virtual code generation device 100 in a storage location matching a point in time when the registration of the virtual code generation device 100 is performed by using the search algorithm included in the virtual code verification means 20. Moreover, the virtual code verification device 200 may store the registration information (e.g., owner information, device information, permission information, or the like) about the virtual code generation device 100 together in the storage location of the actual code or in a separate storage space connected to the actual code storage location.

In an embodiment, when the virtual code generation device 100 is a control device, the virtual code verification device 200 may store the registration information such as a device identification value (a serial number, or the like) of the control device, a permission state of the control device, or the like in advance. In this way, when the virtual code verification device 200 receives the virtual code, the virtual code verification device 200 may identify the registration information matching the corresponding virtual code, and then may perform the corresponding processing quickly. When the result of identifying the registration information indicates that the virtual code generation device 100 transmitting the virtual code is registered in advance, the virtual code verification device 200 may not block an operation of the corresponding control device. When the result of identifying the registration information indicates that the virtual code generation device 100 transmitting the virtual code is not registered in advance, the virtual code verification device 200 may control an operation of the corresponding control device.

For example, the virtual code generation device 100 is a drone, and the virtual code verification device 200 may be a server, which identifies and verifies a drone, such as a control center. The server stores and manages an actual code and registration information associated with a drone registered in a drone registration procedure. The server determines whether to block an operation of a drone to be identified, by performing a drone identification process. In other words, the server receives a virtual code from a drone, searches for a storage location of an actual code matching the received virtual code, identifies registration information of the drone to be identified, and performs the corresponding processing. For example, when a result of identifying the registration information indicates that the drone to be identified is registered as a drone that is permitted to fly for official purposes, the server does not block the flight. When the drone to be identified is not registered (a civilian drone, or the like), the server blocks the flight.

In addition, as another example, the drone, which is the virtual code generation device 100, periodically or continuously outputs a signal having a frequency, which includes a virtual code or corresponds to the virtual code. The server, which is the virtual code verification device 200, such as a control center obtains the signal from the drone and then determines whether the drone is permitted. At this time, the virtual code verification device 200 may store, in advance, a value of the virtual code matched with a detailed unit range within an available frequency range and an available range and may identify the virtual code based on the frequency of the signal received from the drone.

In another embodiment, when the virtual code generation device 100 is a SIM card, the virtual code verification device 200 may store user information and information about a unique value (ICCID, IMSI, or the like) for an SIM card in advance. As an example, when a user subscribes a service of a telecommunication company, receives a USIM or purchases a travel USIM, and registers the user in the USIM, the virtual code verification device 200 stores registration information (a unique value of USIM, user information, or the like) together in the storage location of the actual code or in a separate storage space connected to the actual code storage location. When the virtual code verification device 200 receives the virtual code, the virtual code verification device 200 searches for the storage location of the actual code matching the received virtual code, identifies the registration information, and performs the corresponding processing.

The steps of a method or algorithm described in connection with the embodiments of the present invention may be embodied directly in hardware, in a software module executed by hardware, or in a combination thereof. The software module may reside on a Random Access Memory (RAM), a Read Only Memory (ROM), an Erasable Programmable ROM (EPROM), an Electrically Erasable Programmable ROM (EEPROM), a Flash memory, a hard disk, a removable disk, a CD-ROM, or a computer readable recording medium in any form known in the art to which the present invention pertains.

Although embodiments of the present invention have been described herein with reference to accompanying drawings, it should be understood by those skilled in the art that the present invention may be embodied in other specific forms without departing from the spirit or essential features thereof. Therefore, the above-described embodiments are exemplary in all aspects, and should be construed not to be restrictive.

According to an embodiment of the present invention, because a virtual code for identifying a device is generated based on a unique value inside a device, a virtual code is not matched with any other virtual code regardless of a point in time when the virtual code is generated. Accordingly, the device may be identified accurately.

Besides, according to an embodiment of the present invention, an algorithm for generating a virtual code and searching for an actual code is added only to a virtual code generation device and a virtual code verification device, thereby maintaining a conventional process as it is.

The effects of the present inventive concept are not limited to the aforementioned effects, and other effects not mentioned herein will be clearly understood from the following description by those skilled in the art to which the present invention pertains.

While the present invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A method for identifying a device by using a chip unique value-based virtual code, the method comprising:
   receiving, by a virtual code verification means comprising a computer which is hardware, a virtual code generated by a virtual code generation means comprising a computer which is hardware;
   extracting, by the virtual code verification means, a plurality of detailed codes included in the virtual code; and
   searching, by the virtual code verification means, for an actual code based on the plurality of detailed codes,
   wherein the virtual code is generated based on a unique value assigned in advance to a chip inside the virtual code generation means, and is generated by combining the plurality of detailed codes,
   wherein the plurality of detailed codes have a correlation for searching for the actual code and are changed for each unit count,
   wherein the unit count is set to a specific time interval and is changed as the time interval elapses,
   wherein the virtual code verification means includes a search algorithm,
   wherein the plurality of detailed codes include a first code and a second code, and
   wherein the search algorithm passes a waypoint corresponding to the first code, performs a calculation based on a correlation between the first code and the second code from the waypoint, and searches for the actual code.

2. The method of claim 1, wherein, when the virtual code generation means is a control device, the virtual code is generated by using a unique value of a chip included in the control device as seed data, and
   wherein the unique value of the chip included in the control device is a serial number assigned not to be duplicated for each control device.

3. The method of claim 2, further comprising:
   determining, by the virtual code verification means, whether the control device is permitted;
   when the received virtual code is a normal virtual code, identifying permission information about a registered control device; and
   when the received virtual code is an abnormal virtual code or is not a virtual code generated at a current time point, determining that the register control device is not permitted.

4. The method of claim 1, wherein, when the virtual code generation means is an SIM card, the virtual code is generated by using a unique value of a chip included in the SIM card as seed data, and
   wherein the unique value of the chip included in the SIM card is ICCID or IMSI assigned not to be duplicated for each SIM card.

5. The method of claim 1, further comprising:
   verifying, by the virtual code verification means, the virtual code by determining whether a reception virtual code received from the virtual code generation means is identical to a generation virtual code generated within the virtual code verification means,
   wherein each of the virtual code generation means and the virtual code verification means includes the same virtual code generation function.

6. The method of claim 5, further comprising:
   registering a unique value of the virtual code generation means in the virtual code verification means.

7. The method of claim 6, wherein the virtual code generation means is a control device or an SIM card.

8. A method for identifying a device by using a chip unique value-based virtual code, the method comprising:
   generating, by a virtual code generation means comprising a computer which is hardware, a plurality of detailed codes;
   generating, by the virtual code generation means, a virtual code by combining the plurality of detailed codes; and
   providing, by the virtual code generation means, the virtual code to an outside,
   wherein the virtual code is generated based on a unique value assigned in advance to a chip inside the virtual code generation means, wherein the plurality of detailed codes have a correlation that allows a virtual code verification means comprising a computer which is hardware, to search for an actual code and are changed for each unit count, wherein the unit count is set to a specific time interval and is changed as the time interval elapses, wherein the virtual code verification means includes a search algorithm, wherein the plurality of detailed codes include a first code and a second code, and wherein the search algorithm passes a waypoint corresponding to the first code, performs a calculation based on a correlation between the first code and the second code from the waypoint, and searches for the actual code.

9. An apparatus for verifying a chip unique value-based virtual code, the apparatus comprising:

a virtual code reception unit configured to receive a virtual code generated by a virtual code generation means comprising a computer which is hardware;

a detailed code extraction unit configured to extract a plurality of detailed codes included in the virtual code; and an actual code search unit comprising a search algorithm, and configured to search for an actual code based on the plurality of detailed codes, wherein the virtual code is generated based on a unique value assigned in advance to a chip inside the virtual code generation means, and is generated by combining the plurality of detailed codes, wherein the plurality of detailed codes have a correlation for searching for the actual code and are changed for each unit count, wherein the unit count is set to a specific time interval and is changed as the time interval elapses, wherein the plurality of detailed codes include a first code and a second code, and wherein the search algorithm passes a waypoint corresponding to the first code, performs a calculation based on a correlation between the first code and the second code from the waypoint, and searches for the actual code.

10. An apparatus for generating a chip unique value-based virtual code, the apparatus comprising:

a detailed code generation unit configured to generate a plurality of detailed codes;

a virtual code generation unit configured to generate a virtual code by combining the plurality of detailed codes; and a virtual code provision unit configured to provide the virtual code to an outside, wherein the virtual code is generated based on a unique value assigned in advance to a chip inside the apparatus, wherein the plurality of detailed codes have a correlation that allows a virtual code verification means comprising a computer which is hardware, to search for an actual code and are changed for each unit count, wherein the unit count is set to a specific time interval and is changed as the time interval elapses, wherein the virtual code verification means includes a search algorithm, wherein the plurality of detailed codes include a first code and a second code, and wherein the search algorithm passes a waypoint corresponding to the first code, performs a calculation based on a correlation between the first code and the second code from the waypoint, and searches for the actual code.

* * * * *